United States Patent

Kanazawa et al.

[11] Patent Number: 5,292,182
[45] Date of Patent: Mar. 8, 1994

[54] LIGHT ALLOY CAST WHEEL

[75] Inventors: Michio Kanazawa, Gamagouri; Kuniaki Tomoda; Masayuki Atari, both of Toyokawa, all of Japan

[73] Assignee: Topy Kogyo Kabushiki Kaisha, Tokyo, Japan

[21] Appl. No.: 52,239

[22] Filed: Apr. 20, 1993

Related U.S. Application Data

[63] Continuation of Ser. No. 757,607, Sep. 11, 1991, abandoned.

[30] Foreign Application Priority Data

Sep. 13, 1990 [JP] Japan .................. 2-95595

[51] Int. Cl.⁵ .................. B60B 21/02; B60B 3/06
[52] U.S. Cl. .................. 301/65; 301/95
[58] Field of Search .................. 301/63.1, 65, 95, 96, 301/97, 98

[56] References Cited

U.S. PATENT DOCUMENTS

| | | | |
|---|---|---|---|
| 1,858,663 | 5/1932 | Frank | 301/65 X |
| 1,974,534 | 9/1934 | Frank | 301/65 X |
| 4,047,764 | 9/1977 | Lester | 301/65 X |
| 4,436,133 | 3/1984 | Rohr | 301/65 X |
| 4,453,776 | 6/1984 | Rohr | 301/65 X |
| 4,482,189 | 11/1984 | Samuelson et al. | 301/65 X |
| 4,861,113 | 8/1989 | Imamura et al. | 301/65 |
| 4,969,692 | 11/1990 | Yung | 301/65 X |
| 5,078,453 | 1/1992 | Siwek | 301/65 X |

FOREIGN PATENT DOCUMENTS

| | | | |
|---|---|---|---|
| 1418627 | 12/1975 | United Kingdom | 301/65 |
| 1437975 | 6/1976 | United Kingdom | 301/65 |
| 2202196 | 9/1988 | United Kingdom | 301/65 |
| 8505328 | 12/1985 | World Int. Prop. O. | 301/65 |

OTHER PUBLICATIONS

Principles of Metal Casting; Richard Heine and Philip Rosenthal; pp. 594-605; 1955.

*Primary Examiner*—Russell D. Stormer
*Attorney, Agent, or Firm*—Cushman, Darby & Cushman

[57] ABSTRACT

A light allow cast wheel includes a disk portion and a rim portion integral with the disk portion. The rim portion includes a first flange located closer to the disk portion and a second flange located farther from the disk portion. The second flange includes a radially extending portion which has an outboard surface and an inboard surface. The second flange has a plurality of grooves recessed from the outboard surface of the radially extending portion. Since a thickness of the second flange is reduced due to the grooves, a thermal thickness shrinkage of the second flange which occurs during casting is small. As a result, generation of blow holes in the second flange during casting is prevented.

6 Claims, 5 Drawing Sheets

LIGHT ALLOY CAST WHEEL

This is a continuation of U.S. patent application No. 07/757,607, filed on Sep. 11, 1991, which was abandoned upon the filing hereof.

BACKGROUND OF THE INVENTION

1. Field of the Invention

The present invention relates to an automobile wheel cast of light alloy.

2. Description of the Prior Art

Light alloy cast wheels used for automobiles have a configuration typically shown in FIG. 4 and are molded as shown in FIG. 5.

As illustrated in FIG. 4, the light alloy cast wheel 110 includes a disk portion 112 and a rim portion 114 constructed integral with the disk portion 112. The wheel 110 is mounted to an axle shaft of an automobile at the disk portion 112 and supports a tire at the rim portion 114. The rim portion 114 includes rim flanges 116 and 118 at opposite ends thereof, which radially extend and are curled at their radially outer portions thereof. The rim portion 114 further includes bead seat portion 120 and 122 which are connected to the rim flanges 116 and 118, respectively, and extend in an axial direction. Large loads act on the rim flanges 116 and 118 and the bead seat portions 120 and 122. Rim flanges 116 and 118 receive an axially acting pressure load from the tire, and the bead seat portions 120 and 122 receive a reaction force from the ground through the tire.

In a low pressure casting of the light alloy wheel, as illustrated in FIG. 5, a molten low alloy metal 150 is biased by pressure into a cavity formed between a first mold 152 and a second mold 154. The molten metal 150 enters the cavity at a central portion of the cavity which corresponds to a boss portion of the disk portion 112. Therefore, the molten metal 150 initially fills a portion of the cavity corresponding to the disk portion 112 and then fills a portion of the cavity corresponding to the rim portion 114. After a predetermined period of time has elapsed and the metal poured into the cavity of the molds has coagulated, the molds are opened so that the wheel can be removed from the molds.

However, there is a problem in the above-described conventional casting. More particularly, the rim flange 116 located farther from the disk portion 112 is constructed so as to have a larger thickness than the bead seat portion 120 connected to the rim flange 116 because the rim flange 116 must endure a large side load from the tire. As a result, when the molten metal in the cavity coagulates, a portion of the molten metal filling the bead seat portion 120 will coagulate before a portion of the molten metal filling the rim flange 116 which is farther from the disk portion 112. Therefore, when the flange filling molten metal coagulates after the bead seat portion filling molten metal, movement of molten metal from the boss portion to the rim flange 116 through the bead seat portion 120 stops, and blow holes will occur in the flange filling molten metal as it is cooled. A considerably many blow holes will occur because the rim flange 116 has a relatively large thickness and shrinks by a relatively large amount. Since the rim flange 116 must have a sufficient strength to endure the side pressure load from the tire, blow holes are undesirable.

SUMMARY OF THE INVENTION

An object of the invention is to provide a structure of a low alloy cast wheel which can suppress the occurrence of blow holes in a rim flange during casting.

This object is attained by a low alloy cast wheel in accordance with the present invention. The wheel includes a disk portion extending in a direction substantially perpendicular to an axis of the wheel and an annular rim portion constructed integral with the disk portion. The rim portion includes a first flange located closer to the disk portion, a second flange located farther from the disk portion, a first bead seat portion connected to the first flange, a second bead seat portion connected to the second flange, and a dropped portion connecting the first bead seat portion and the second bead seat portion. The second flange includes a curled portion at a radially outer end of the second flange and a radially extending portion connecting the curled portion of the second flange and the second bead seat portion. The radially extending portion of the second flange has an outboard surface extending in a direction substantially perpendicular to the axis of the wheel and an inboard surface. The second flange has a plurality of grooves formed through casting and recessed from the outboard surface of the radially extending portion toward the inboard surface of the radially extending portion.

Since the wheel of the present invention has a plurality of grooves in the second flange located farther from the disk portion, the recessed portion of the radially extending portion of the second flange is reduced in thickness. As a result, the shrinkage amount of the recessed portion of the second flange during cooling is small so that the occurrence of blow holes in the second flange is effectively suppressed. Since the non-recessed portions remaining between grooved portions function as ribs to reinforce the second flange, the strength of the wheel is maintained sufficiently. As to the first flange, since it is located closer to the disk portion, molten metal is sufficiently supplied to the first flange from the disk portion and no problems occur.

BRIEF DESCRIPTION OF THE DRAWINGS

The above and other objects, features, and advantages of the present invention will become more apparent and readily appreciated from the following detailed description of the preferred embodiments of the invention taken in conjunction with the accompanying drawings, in which.

DETAILED DESCRIPTION OF THE PREFERRED EMBODIMENT

Figure 1:
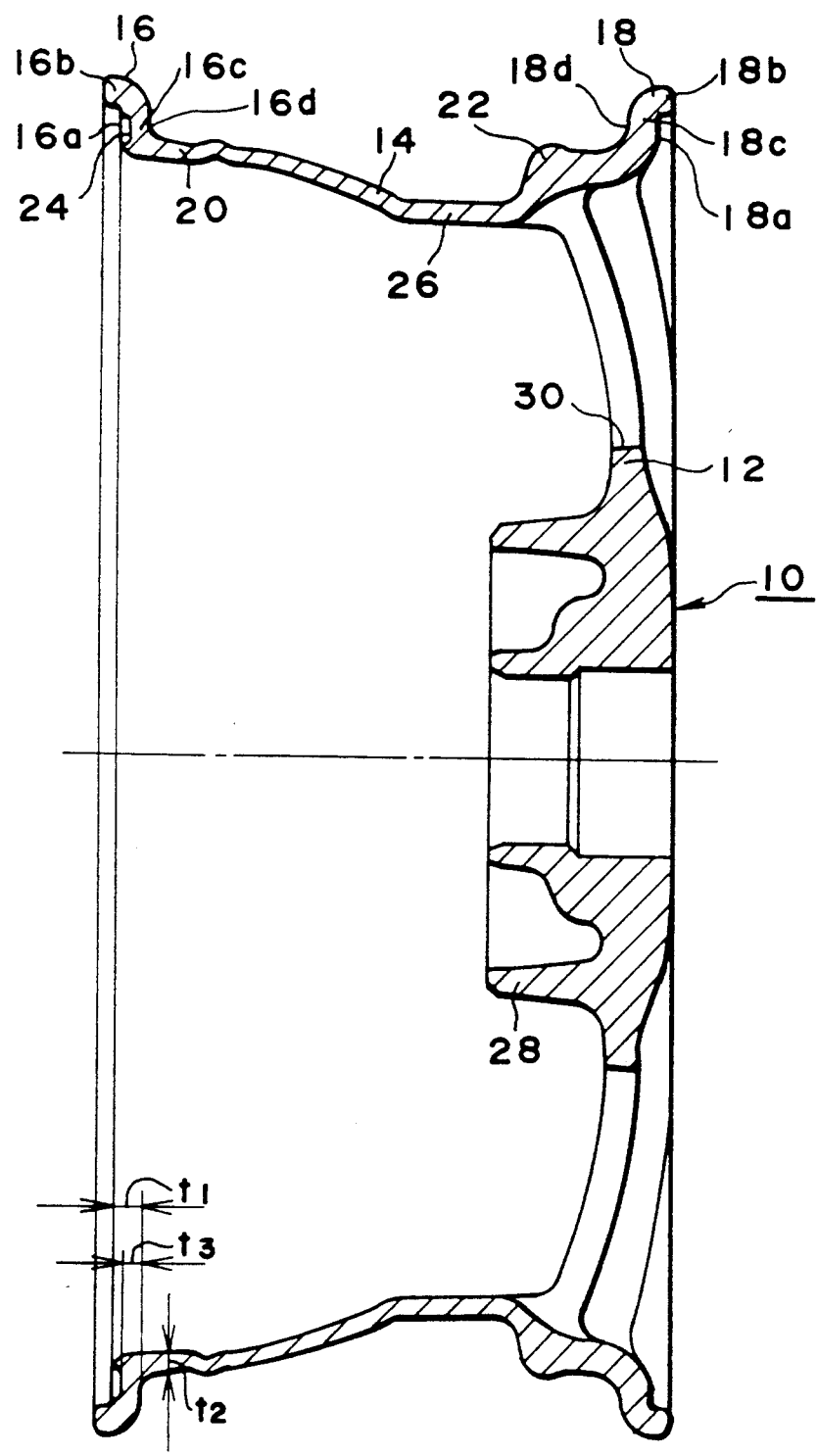
FIG. 1 is a cross-sectional view of a low alloy cast wheel in accordance with one embodiment of the present invention.
Figure 2:
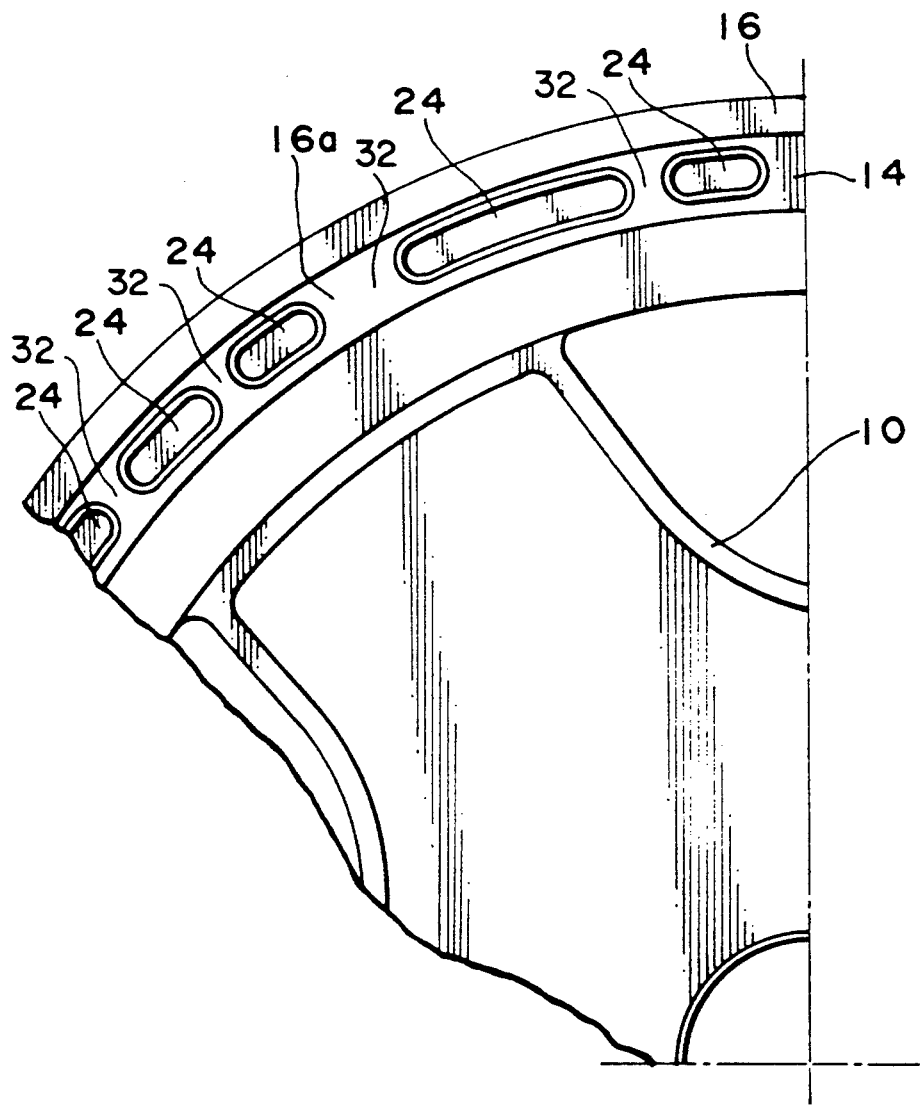
FIG. 2 is a partial, rear elevational view of the wheel of FIG. 1.

As illustrated in FIGS. 1 and 2, a low alloy cast wheel 10 in accordance with one embodiment of the present invention is cast of a light alloy, such as aluminum. The wheel 10 has an axis and generally includes a disk portion 12 and a rim portion 14. The disk portion 12 extends in a direction substantially perpendicular to the axis of the wheel 10, and the rim portion 14 is annular and integral with the disk portion 12. The wheel 10 is fixed to an axle shaft of a vehicle at the disk portion 12 and supports a tire at the rim portion 14.

The disk portion 12 has a boss portion 28 at a central portion of the disk portion 12 where molten metal is poured into a cavity of a mold when the wheel 10 is cast. The disk portion 12 may have a plurality of decoration holes 30. The disk portion 12 is connected to the rim portion 14 at a front end portion of the rim portion 14.

The rim portion 14 includes a first flange 18 located closer to the disk portion 12 (i.e., the front end portion of the rim portion 14), a second flange 16 located farther from the disk portion 12, a first bead seat portion 22 connected to the first flange 18, a second bead seat portion 20 connected to the second flange 16, and a dropped portion 26 connected between the first bead seat portion 22 and the second bead seat portion 20.

The first flange 18 has a curled portion 18b at a radially outer end of the first flange 18 and a radially extending portion 18c connected between the curled portion 18b and the first bead seat portion 22. The radially extending portion 18c of the first flange 18 has an outboard surface 18a extending in a direction perpendicular to the axis of the wheel 10 and an inboard surface 18d. Similarly, the second flange 16 has a curled portion 16b at a radially outer end of the second flange 16 and a radially extending portion 16c connected between the curled portion 16b and the second bead seat portion 20. The radially extending portion 16c of the second flange 16 has an outboard surface 16a extending in a direction perpendicular to the axis of the wheel 10 and an inboard surface 16d. The first flange 18 and the second flange 16 receive tire pressure forces, and the first bead seat portion 22 and the second bead seat portion 20 receive reaction forces from the ground through a tire.

The second flange 16 has a plurality of grooves 24 formed in the radially extending portion 16c of the second flange 16. The grooves 24 prevent blow holes from occurring in the second flange 16 during molding. The grooves 24 are formed through casting by a mold, and not through machining. The grooves 24 are formed in the second flange 16 only and are not formed in the first flange 18 because the first flange 18 is located close to the disk portion 12; and therefore, molten metal is smoothly supplied to the first flange 18. The grooves 24 are recessed from the outboard surface 16a toward the inboard surface 16d of the radially extending portion 16c of the second flange 16. However, the grooves 24 do not penetrate the radially extending portion 16c so that air in the tire does not leak through the second flange 16. The grooves 24 open to the outboard surface 16a only and not to the inboard surface 16d of the second flange 16 so that air leak is prevented. In this instance, if the grooves were formed so as to open to the inboard surface, air leak would occur through the grooves.

The grooves 24 extend in a circumferential direction of the wheel 10. Since the grooves are not continuous, non-recessed portions remain between adjacent grooves of a plurality of grooves 24 so that the non-recessed portions form ribs 32 which radially extend and reinforce the grooved second flange 16. If the grooves were continuous and no ribs were provided, the strength of the second flange 16 would be insufficient to endure the pressure force from the tire.

Circumferential lengths of the grooves 24 may be different from each other, affected by an uneven configuration of the wheel itself in the circumferential direction of the wheel.

The non-recessed portion of the radially extending portion 16c of the second flange 16 has a first thickness t1, and the second bead seat portion 20 has a second thickness t2. The first thickness t1 is larger than the second thickness t2 so that the second flange 16 sufficiently endures the side load from the tire.

The recessed portions of the radially extending portion 16c of the second flange 16 has a third thickness t3 which is smaller than the second thickness t2 of the second bead seat portion 20, so that an average thickness of the second flange 16 including the recessed and non-recessed portions is equal to or less than the second thickness t2 of the second bead seat portion 20. This structure allows the molten metal filling the second flange 16 to coagulate before the molten metal filling the second bead seat portion 20. Therefore, the second flange 16 will not be prevented from being supplied with molten metal.

Circumferential ends of the grooves 24 are configured to form a semicircle when viewed from the rear side of the wheel, as shown in FIG. 2. Also, a bottom surface of each groove 24 is connected to a side surface of the groove 24 via a curved surface. Due to these configurations, stress concentration at the circumferential ends of the grooves 24 and at the corner between the bottom surface and the side surface of the groove is suppressed, and fatigue strength of the wheel 10 is maintained sufficiently.

Figure 3:
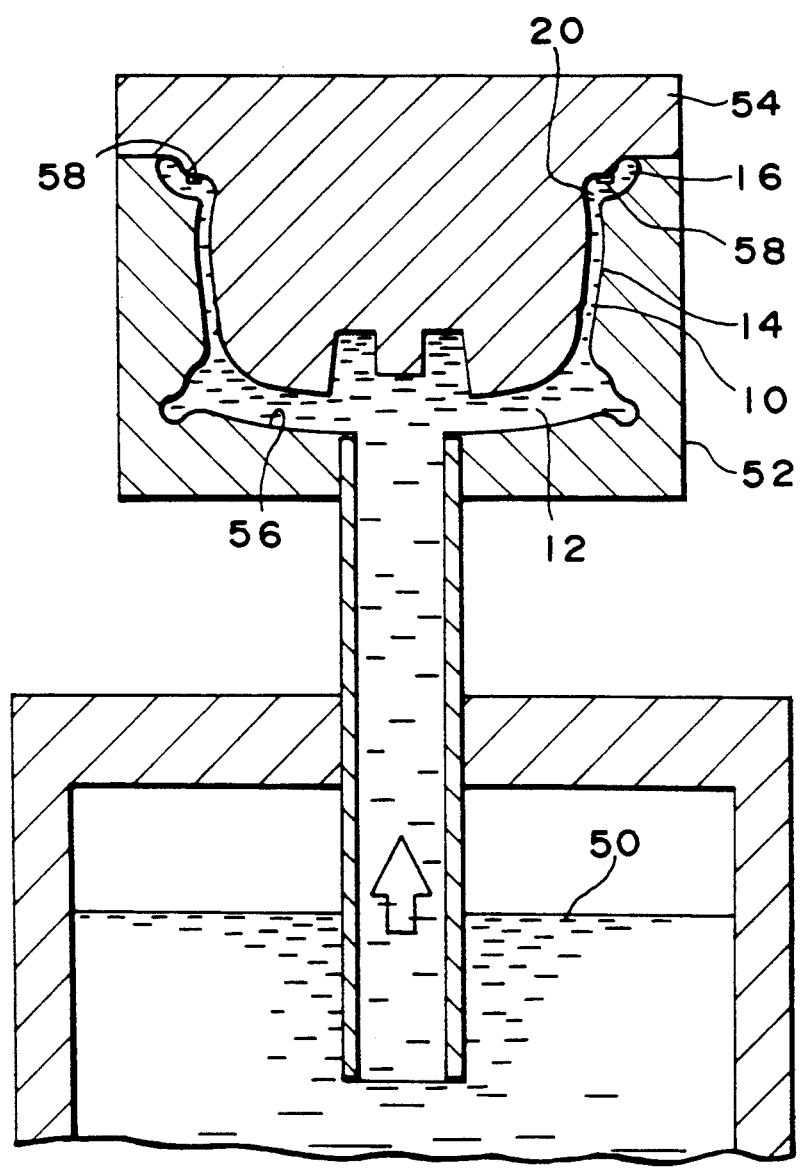
FIG. 3 is a cross-sectional view of a casting apparatus which can be used for casting of the wheel of FIG. 1.
Figure 4:
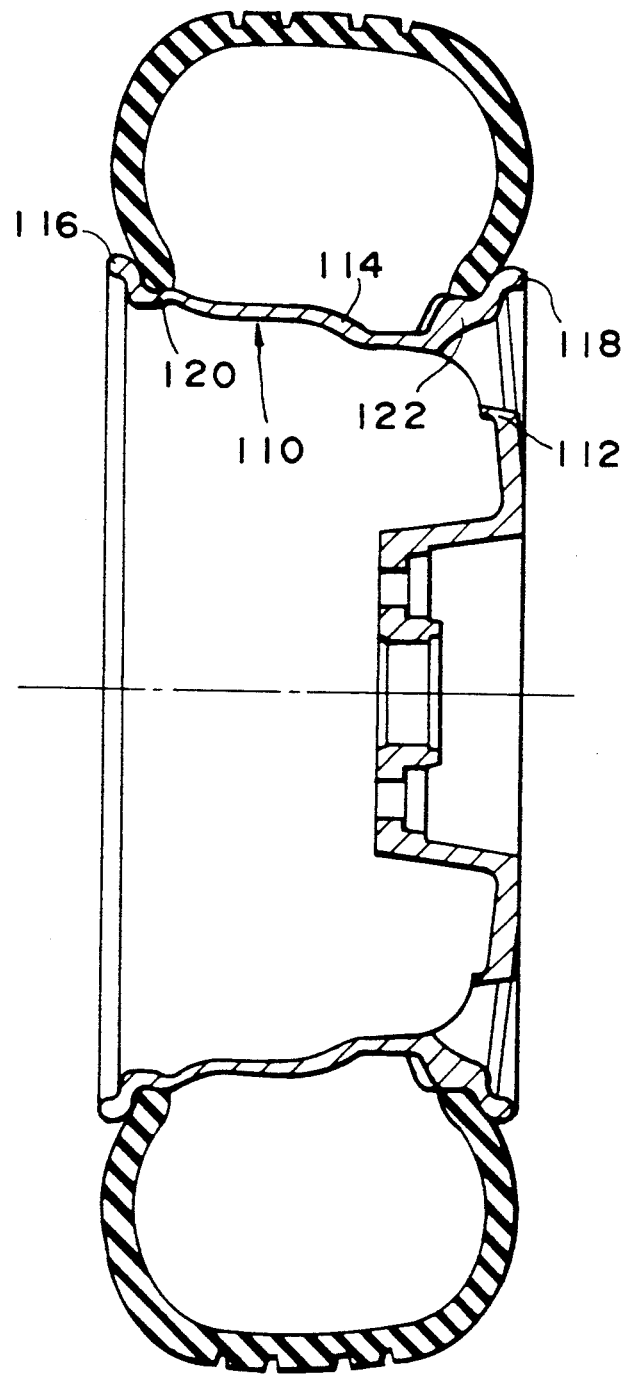
FIG. 4 is a cross-sectional view of a conventional cast wheel and tire assembly.
Figure 5:
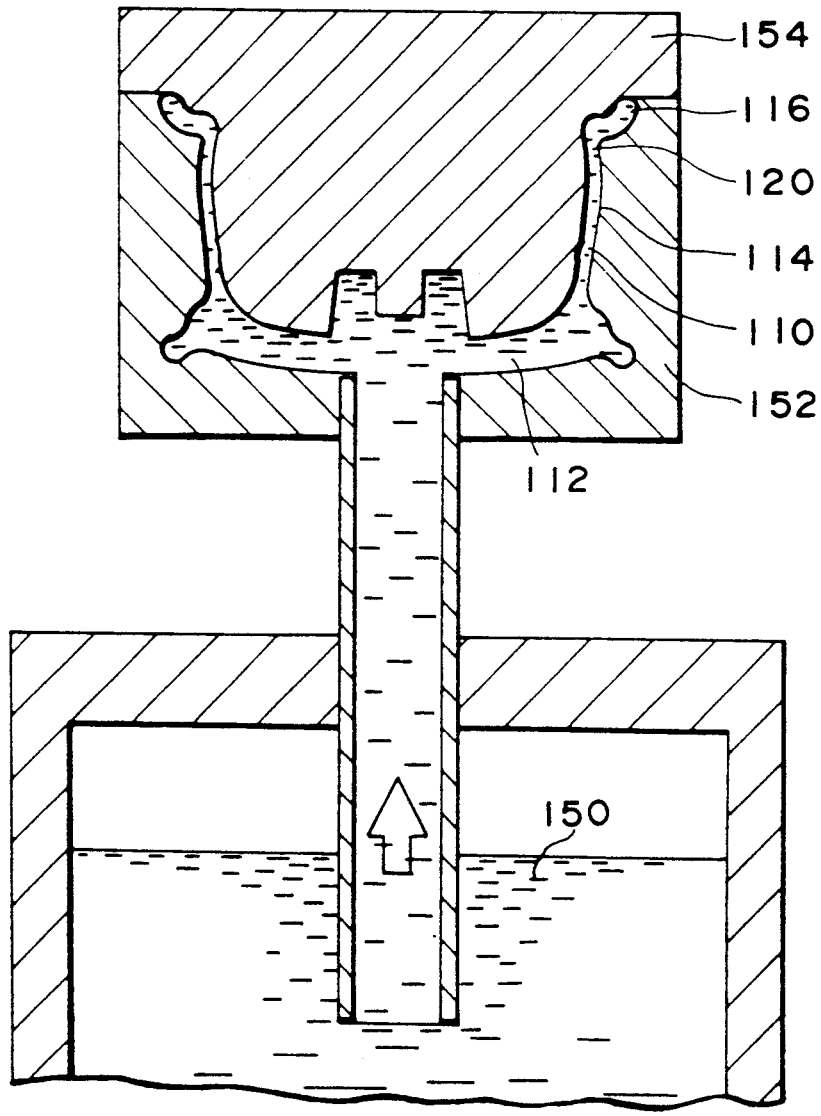
FIG. 5 is a cross-sectional view of a conventional casting apparatus used for casting a conventional cast wheel.

The wheel 10 having the above-described structure is cast using a casting apparatus shown in FIG. 3. More particularly, the casting apparatus has a lower mold 52 and an upper mold 54 which define a cavity 56 therebetween. The upper mold 54 has a plurality of downwardly protruding protrusions 58 for forming the grooves 24 in the second flange 16. Molten metal 50 is biased into the cavity 56 by pressure. The molten metal enters the cavity at the central portion of the disk portion 12 of the wheel 10 and fills the cavity 56. Since the wheel 10 has the grooves 24, the average thickness of the second flange 16 is decreased and tends to coagulate before the second bead seat portion 20 coagulates. In addition, since the grooves 24 have a small thickness, the shrinkage amount of the recessed portions of the second flange 16 is very small and blow holes will not occur during cooling.

Furthermore, the grooves 24 are not continuous to each other and the ribs 32 remain between the grooves 24. As a result, the ribs 32 reinforce the grooved second flange 16 and sufficient strength is maintained to endure the side load from a tire.

As will be apparent from the above description, in accordance with the present invention, the following advantages are obtained.

First, since a rim flange located farther from a disk portion has a plurality of grooves, generation of blow holes in the rim flange during casting will be effectively suppressed.

Second, since the rim flange located farther from the disk portion has ribs between the grooves, the rim flange maintains a sufficient strength to endure side loads from a tire.

Third, the grooves formed in the rim flange contributes to reduction in weight of the wheel.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. A light alloy cast wheel comprising:
    a disk portion extending in a direction substantially perpendicular to an axis of the light alloy cast wheel; and
    an annular rim portion constructed integral with the disk portion, the rim portion including a first flange located closer to the disk portion, a second flange located farther from the disk portion, a first bead seat portion connected to the first flange, a second bead seat portion connected to the second flange, and a dropped portion connecting the first bead seat portion and the second bead seat portion, the second flange including a curled portion at a radially outer end of the second flange and a radially extending portion connecting the curled portion of the second flange and the second bead seat portion, the radially extending portion of the second flange having an outboard surface extending in a direction substantially perpendicular to the axis of the light alloy cast wheel and an inboard surface, the second flange having a plurality of grooves formed through casting and recessed from the outboard surface of the radially extending portion toward the inboard surface of the radially extending portion; and wherein
    non-recessed portions remain between adjacent grooves of the plurality of grooves, the non-recessed portions forming radially extending ribs which reinforce the second flange, the non-recessed portions having a first thickness and the second bead seat portion has a second thickness, the first thickness being larger than the second thickness;
    grooved portions of the radially extending portion of the second flange have a third thickness, the third thickness being smaller than the second thickness; and
    wherein the second flange has an average thickness comprised of grooved and non-recessed portions about the circumference of the second flange, and the average thickness of the second flange is less than or equal to the second thickness.

2. The light alloy cast wheel according to claim 1, wherein the plurality of grooves extend in a circumferential direction of the light alloy cast wheel.

3. The light alloy cast wheel according to claim 1, wherein circumferential lengths of the plurality of grooves are different from each other.

4. The light alloy cast wheel according to claim 1, wherein circumferential ends of the plurality of grooves are configured to form a semicircle.

5. The light alloy cast wheel according to claim 1, wherein each of the plurality of grooves has a bottom surface and a side surface connected to the bottom surface via a curved surface.

6. A light alloy cast wheel comprising:
    a disk portion extending in a direction substantially perpendicular to an axis of the light alloy cast wheel; and
    an annular rim portion constructed integral with the disk portion, the rim portion including a first flange located closer to the disk portion, a second flange located farther from the disk portion, a first bead seat portion connected to the first flange, a second bead seat portion connected to the second flange, and a dropped portion connecting the first bead seat portion and the second bead seat portion, the second flange including a curled portion at a radially outer end of the second flange and a radially extending portion, distinguishable from the curled portion, connecting the curled portion of the second flange and the second bead seat portion, the radially extending portion of the second flange having an outboard surface extending in a direction substantially perpendicular to the axis of the light alloy cast wheel and an inboard surface, the curled portion curling in a direction axially away from the outboard surface of the radially extending portion, the second flange having a plurality of grooves formed through casting and recessed from the outboard surface of the radially extending portion toward the inboard surface of the radially extending portion, the grooves being formed only in the radially extending portion; and wherein
    non-recessed portions remain between adjacent grooves of the plurality of grooves, the non-recessed portions forming radially extending ribs which reinforce the second flange, the non-recessed portions having a first thickness and the second bead seat portion has a second thickness, the first thickness being larger than the second thickness;
    grooved portions of the radially extending portion of the second flange have a third thickness, the third thickness being smaller than the second thickness; and
    wherein the second flange has an average thickness comprised of grooved and non-recessed portions about the circumference of the second flange, and the average thickness of the second flange is less than or equal to the second thickness.

* * * * *